J. E. BREWER.
INSECT TRAP.
APPLICATION FILED JUNE 20, 1914.
1,148,748.
Patented Aug. 3, 1915.
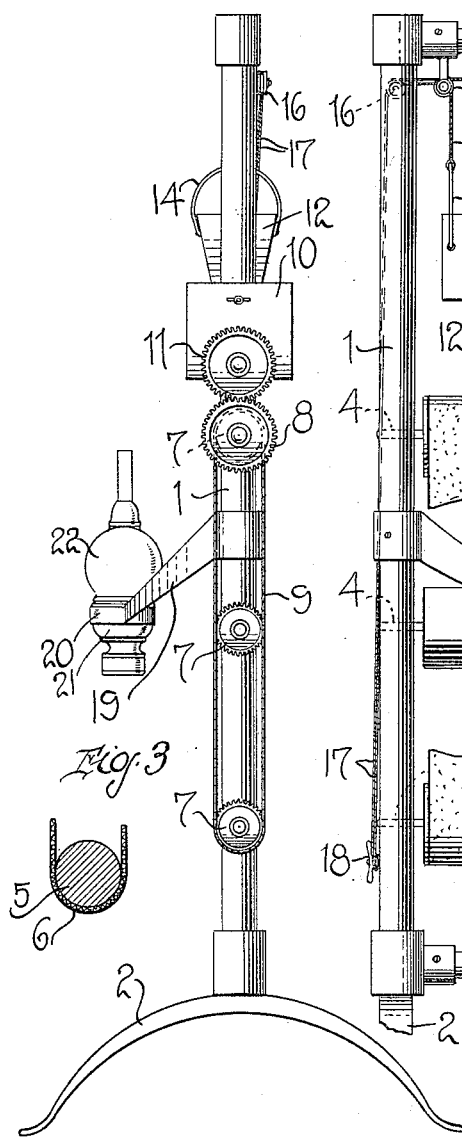
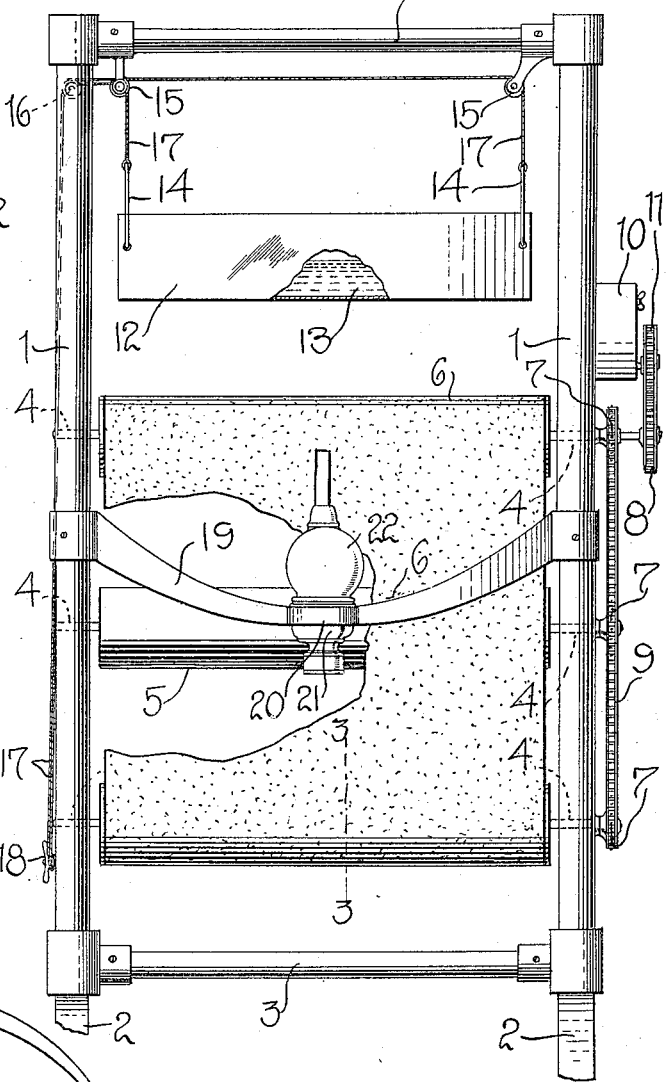
Inventor
J. E. BREWER
Witnesses
Robert M. Sutphen
A. S. Hurd
By Watson E. Coleman
Attorney

UNITED STATES PATENT OFFICE.

JAMES E. BREWER, OF PINSON, TENNESSEE.

INSECT-TRAP.

1,148,748.  Specification of Letters Patent.  Patented Aug. 3, 1915.

Application filed June 20, 1914. Serial No. 846,386.

*To all whom it may concern:*

Be it known that I, JAMES E. BREWER, a citizen of the United States, residing at Pinson, in the county of Madison and State of Tennessee, have invented certain new and useful Improvements in Insect-Traps, of which the following is a specification, reference being had to the accompanying drawings.

This invention relates to new and useful improvements in traps, and particularly to traps for destroying flying insects.

An object of this invention is the provision of a trap which is adapted for use in catching insects during the day time, and which is also provided with means for attracting the insects at night.

A further object of this invention is the provision of a trap which comprises a pair of uprights in which the opposite reduced ends of rollers are mounted, the rollers carrying a paper or cloth belt coated with adhesive substance, and the rollers being rotated by a suitable motor supported upon one of the uprights, the insects when flying against the belt being held thereon by the adhesive coating, the endless belt carrying the adhesive substance being readily removable from the rollers when filled, so that the rollers may be used indefinitely.

A still further object of this invention is the provision of a trap of this character upon the uprights of which the opposite ends of a lamp bracket are connected, the intermediate portion of the bracket which supports the lamp being bowed to one side of the uprights, so that the lamp which attracts the insects at night is disposed to one side of the rollers.

With these and other objects in view, my invention consists in the novel construction, combination, and arrangement of parts to be hereinafter more fully described, claimed, and illustrated in the accompanying drawing, in which, Figure 1 is a side elevational view of my improved trap; Fig. 2 is a front elevational view thereof; and Fig. 3 is a sectional view on the line 3—3 of Fig. 1.

Referring more particularly to the drawing, the numeral 1 designates a pair of uprights or standards, which are supported at their lower ends upon suitable feet 2, and being connected together at their upper and lower ends by cross rods 3.

Mounted in transversely alined openings 4 in the standards 1 are the reduced ends of rollers 5, upon which are disposed an endless belt 6 which is covered with any desired non-hardening adhesive substance, such as is used on ordinary fly paper. Keyed on one end of each of the rollers 5 is a sprocket wheel 7, and mounted upon the extremity of the uppermost roller outwardly of the sprocket wheel 7 is a gear wheel 8, the sprocket wheels being connected together by a suitable sprocket chain 9.

Connected to one of the standards above the uppermost roller, is a motor casing 10 in which a suitable spring motor or the like (not shown) is contained, the motor including a gear wheel 11 which meshes with the gear wheel 8 so that upon operation of the motor, all of the rollers 5 are simultaneously operated through the medium of the sprocket chain 9 which engages the sprocket wheels 7 on the reduced ends of the rollers.

Disposed between the standards above the uppermost roller is a tank 12 which contains a fluid 13, the fluid 13 being preferably molasses or sweetened water, so that insects will be attracted thereby, the tank 12 being provided on its opposite ends with upstanding handles 14. Carried upon the inwardly extending collars which receive the opposite ends of the upper cross rod 3 are depending pulleys 15, and mounted in a suitable yoke connected to the upper end of the standards 1 on the opposite side of the device from the motor 10, is a similar pulley 16, a pair of operating cords 17 being passed over the pulley 16, one end of the cords extending over one of the pulleys 15 and being thence disposed downwardly to be connected to one of the handles 14 of the tank, the end of the other cord 17 being disposed across the frame and over the other pulley 15 and engaged with the handle 14 on the opposite end of the tank 12. The free ends of the operating cords extend downwardly for engagement with a keeper 18 which is connected to the standards below the pulley 16. Connected to the standards intermediate of their ends are the opposite ends of a bowed supporting bracket 19 which has an enlarged apertured lug 20 intermediate of its ends, the supporting stem 21 of a lamp 22 being disposed through the opening in the lug 20, whereby the lamp is disposed to one side of the rollers so that when the lamp is lighted, the heat of the same will not scorch or burn the adhesive coating 2 upon the uppermost roller.

In the practical use of my improved trap, the same is placed in a field or open space, with the tank 12 containing the molasses 13 or the like supported upon the cords above the uppermost roller. During the day time, the lamp 22 is extinguished and the motor 10 is operated to rotate the rollers 5 through the medium of the gear wheels 11 and 8 and the sprocket wheels 7 which are engaged by the chain 9, and it will be seen that the insects attracted by the molasses contained within the tank and the adhesive coating on the belt 6 carried by the rollers 5 will fly against the rollers or into the tank and be caught. At night the lamp 22 is lighted, and the insects are attracted by the light of the lamp, and flying around the same will engage against the rollers and will thus be caught on the coating of the tubes. The rollers are continuously rotated to dispose different portions thereof toward the lamp 22 which is supported to one side of the rollers so that the insects attracted by the light of the lamp will engage against different portions of the rollers and prevent a complete filling of one side of the rollers with insects, which would otherwise occur were the tube supports stationary. It will be seen that when it is desired to empty the molasses 13 or other material carried in the tank 12 to renew the same, the tank 12 may be readily lowered to the ground by disengaging the free ends of the cords 17 from the hook 18, and upon replenishment of the tank, the same may be again elevated to the desired position above the uppermost roller and held in this position by reëngaging the free ends of the cords 17 with the hook.

From the above description, taken in connection with the accompanying drawing, it will be seen that I have provided a trap for catching flying insects which is equally effective both during the day time and at night, the trap requiring no attention except to light and extinguish the lamp 22 and to replace the tubes 6 on the rollers and the liquid 13 in the tank at intervals when the same become filled with insects.

The device comprises a minimum number of parts so that the same may be cheaply manufactured and is extremely efficient and durable in use.

Having thus fully described my invention, what I desire to claim and secure by Letters Patent, is:—

In an insect trap, the combination with a frame including spaced vertical standards connected by a cross bar at their upper ends, a series of rollers journaled between the standards, an endless apron engaged upon said rollers, means mounted upon the frame for positively driving said apron, hanger guides fixed to the cross bar of the frame, a lure container substantially equivalent in width to the apron and disposed above the same, and flexible members trained over said guides and connected to opposite ends of said container to vertically adjust the same between the apron and the cross bar of the frame and also to permit the container to be lowered to replenish the lure.

In testimony whereof I hereunto affix my signature in the presence of two witnesses.

JAMES E. BREWER.

Witnesses:
E. L. McCALLUM,
T. S. ZIN.

Copies of this patent may be obtained for five cents each, by addressing the "Commissioner of Patents, Washington, D. C."